United States Patent [19]

Lemelson et al.

[11] 4,428,685
[45] Jan. 31, 1984

[54] TEMPERATURE TALKING INDICATING DEVICE

[76] Inventors: Jerome H. Lemelson, 85 Rector St., Metuchen, N.J. 08840; Christrian Grund, 2035 Burr Ave., Bronx, N.Y. 10461

[21] Appl. No.: 193,284

[22] Filed: Oct. 2, 1980

Related U.S. Application Data

[63] Continuation-in-part of Ser. No. 68,609, Aug. 22, 1979, abandoned, and Ser. No. 81,365, Oct. 1, 1979.

[51] Int. Cl.³ .......................... G01K 7/00; G10L 1/10
[52] U.S. Cl. ..................... 374/163; 374/183; 381/51
[58] Field of Search ............ 73/362 R; 340/692; 179/1 SG, 1 SM; 364/557; 374/169, 163, 170

[56] References Cited

U.S. PATENT DOCUMENTS

| | | | |
|---|---|---|---|
| 3,158,685 | 11/1964 | Gerstman et al. | 179/1 SG |
| 3,453,546 | 7/1969 | Fryer | 374/163 |
| 3,683,346 | 8/1972 | Horton | 340/384 E X |
| 3,817,105 | 6/1974 | Luhowy | 374/163 X |
| 3,822,598 | 7/1974 | Brothers et al. | 374/169 |
| 3,870,818 | 3/1975 | Barton et al. | 340/692 X |
| 3,903,471 | 9/1975 | Hiraga et al. | 340/692 X |
| 3,922,716 | 11/1975 | Arnold et al. | 369/22 X |
| 3,972,237 | 8/1976 | Turner | 374/169 |
| 4,000,489 | 12/1976 | Bench | 340/384 E |
| 4,125,023 | 11/1978 | Amemiya et al. | 73/362 AR |
| 4,161,880 | 7/1979 | Prosky | 364/557 X |
| 4,199,986 | 4/1980 | Ganslmeier et al. | 374/170 X |
| 4,277,975 | 7/1981 | Pinkham | 73/362 AR |
| 4,278,970 | 7/1981 | Streczyn et al. | 73/362 AR |
| 4,308,465 | 12/1981 | Lafuze | 307/87 |
| 4,348,650 | 9/1982 | Tsuzuki et al. | 179/1 SM |

OTHER PUBLICATIONS

Publ. "Tired of Just Reading Results? Let Your Instrument Do The Talking" *Design Engineering* 24, Nov. 22, 1978, pp. 160–163, V. B. Tandon.

*Primary Examiner*—Daniel M. Yasich

[57] ABSTRACT

An instrument for indicating variations in an ambient condition, such as temperature, atmospheric pressure or weather wherein such indications are given by means of synthetic speech. Control signals generated by the memory comparator are employed to selectively activate a speech synthesizer generating selected synthetic speech signals which are fed to a digital-to-analog converter and the analog signals generated thereby are transduced to speech sounds in a speaker. In one form, the instrument is supported in a hand held housing containing electronic circuits and a sensor for sensing temperature as well as a battery, controls, on-off switch, display, speaker and synthetic speech signal generator. In another form, the sensor is supported at the end of a tubular housing to be inserted into a body cavity or the mouth for sensing body temperature and generating signals indicative thereof which signals are transmitted to electronic circuit means via flexible cable to a hand held or table top supported unit containing such other elements. Temperature is both displayed and indicated with sounds of speech.

14 Claims, 2 Drawing Figures

TEMPERATURE TALKING INDICATING DEVICE

RELATED APPLICATIONS

This is a continuation-in-part of copending applications Ser. No. 68,609 filed Aug. 22, 1979 now abandoned, and Ser. No. 81,365 filed Oct. 1, 1979 for Measuring Device and Method.

SUMMARY OF THE INVENTION

This invention relates to an apparatus and method for taking and indicating temperature, such as the temperature of a liquid, solid or other material and including body temperature. In particular, the invention is directed to a portable hand-held temperature indicating unit which includes, in addition to its own source of electrical energy, microminiature electronic circuit means for processing signals generated by a temperature sensing transducer which may be supported by the unit or separate therefrom and connected to the electronic circuit by means of a flexible wire or cable. A prime feature of the apparatus or device is its ability to sense a temperature and, either automatically or upon operation of a user controlled switch, to generate a speech indication of the temperature in the form of one or more words which are generated from a synthetic speech signal generator. As a result, reading errors sometimes resulting from visually reading a scale or display, are eliminated and, if a visual display is also provided as part of the unit, its display of temperature may be checked against the verbal indication of the temperature heard by the person using the unit. Temperature sensing and indicating is thus substantially simplified and may be effected by persons with poor eyesight and blind persons.

Accordingly it is a primary oject of this invention to provide a new and improved apparatus and method for measuring and indicating temperature.

Another object is to provide an improved temperature sensing and indicating device which employs synthetic speech signals and sounds of words generated thereby which indicate to the user of the device the temperature sensed thereby.

Another object is to provide a new and improved temperature indicating device and method which employs both visual and audible indications of a temperature measured or sensed.

Another object is to provide an improved temperature indicating device which may be used by persons having poor vision and blind persons.

Another object is to provide a temperature indicating device which is simple to operate and void of human error sometimes made by improper reading a temperature scale or other indication of temperature.

Another object is to provide a temperature indicating device having means for generating synthetic speech indications of temperature wherein such speech indications may be repeated one or more times in the event that the person using the device does not properly hear the first or subsequent speech indications of temperature.

Another object is to provide a temperature taking and indicating device which may be used by a patient or persons who are not skilled in reading a scale or other means for visually indicating temperature.

With the above and such other objects in view as may hereinafter more fully appear, the invention consists of the the novel constructions, combinations and arrangements of parts and electrical components as will be more fully described and illustrated in the accompanying drawings but it is to be understood that changes, variations and modifications may be resorted to which fall within the scope of the invention as claimed.

Figure 1:
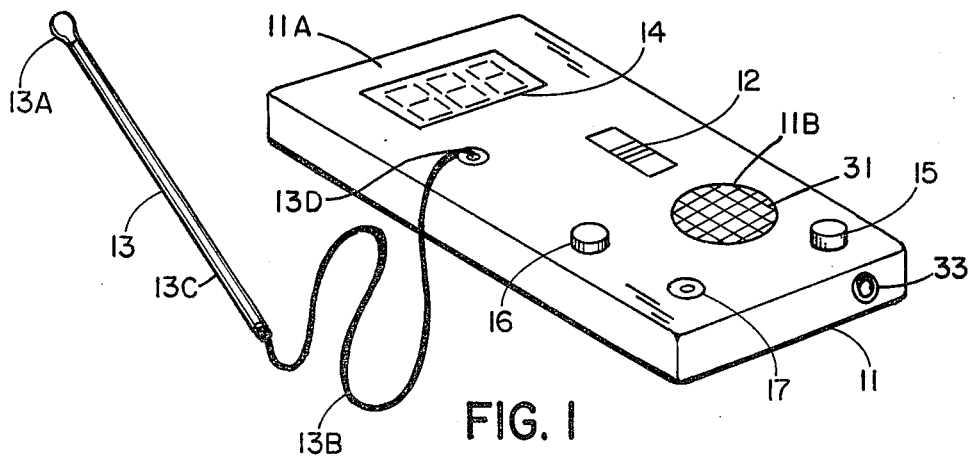
FIG. 1 is an isometric view of a temperature taking and indicating device.

In FIG. 1 is shown a basic form of the instant invention in the form of a temperature indicating device 10 composed of a box-like housing 11 which may be small enough to fit in the pocket of the user and which has a top wall portion 11A thereof containing an opening or cavity 11B in the top wall of the housing for accommodating a microphone and speaker; and electrically operated display 14 for numerically indicating temperature, a push-button switch 12, a knob for a volume control means 16 and a jack for receiving a plug connected to an earphone to be worn by the user of the device in the event that it is desired to maintain silence in using the device.

The device 10 also includes a thermometer probe 13 which includes an elongated tubular housing 13C and a temperature sensor or transducer 13A supported at the end of the tubular member 13C. A flexible cable or line 13B connects the sensor 13A at the end of the housing 13C to electronic circuit means located within the housing 11 by means of a pluggable connector 13D secured to the top wall of the housing.

Figure 2:
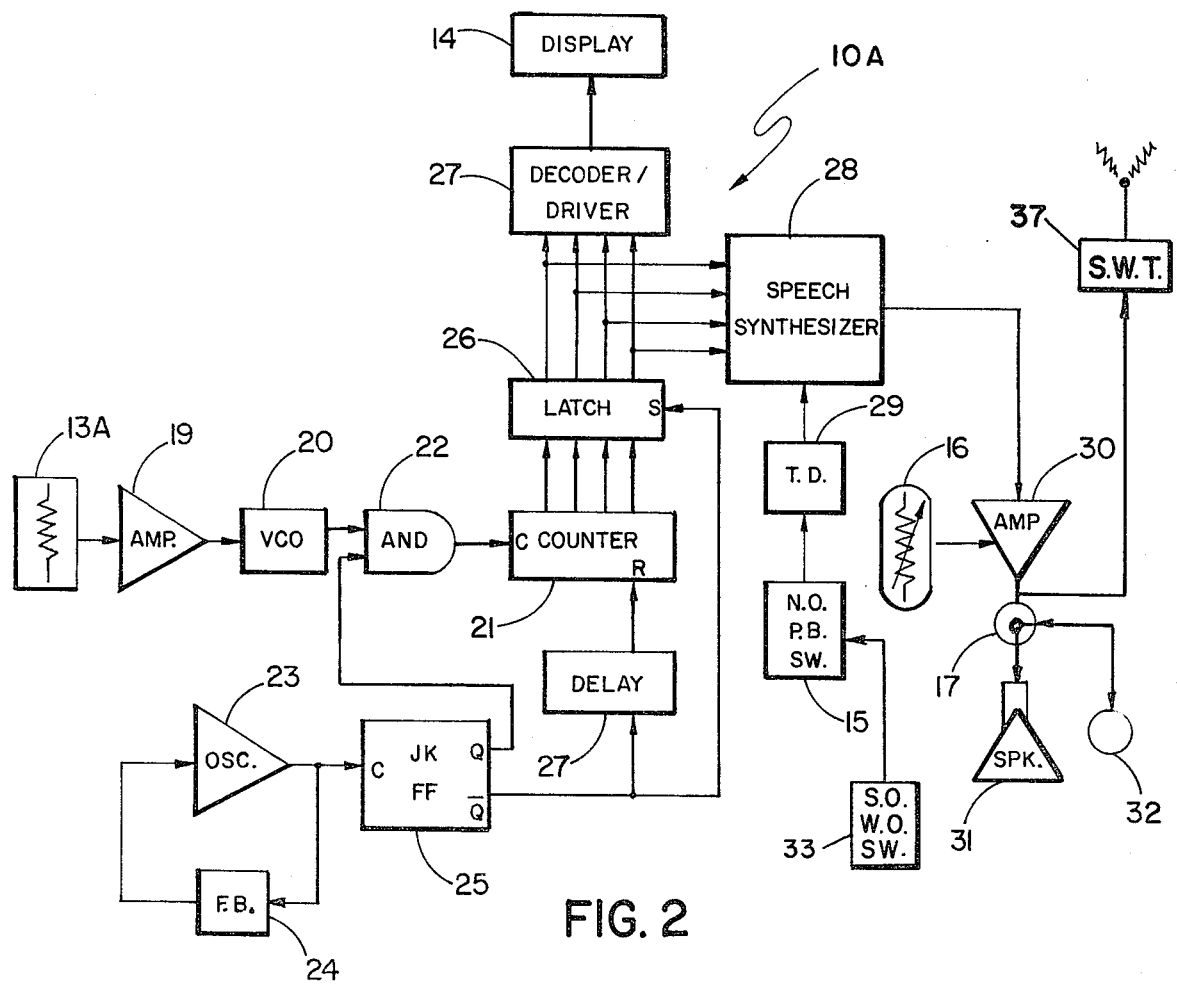
FIG. 2 is a schematic diagram of electrical circuitry forming part of the device of FIG. 1.

In FIG. 2 is shown electronic circuitry 10A located within the housing 11 for controlling temperature sensing and indication as will be described. The circuitry of each box of FIG. 2 is constructed of well known circuits of the type known as C-MOS discrete circuitry. The usage of these well known devices is shown in U.S. Pat. No. 4,308,465. A power supply or battery is operatively connectable to properly power the illustrated electrically operated components by means of a bistable manual switch 12 when the latter is manually or otherwise closed. The end of probe 13 may be inserted into the mouth or rectum of a person whose temperature is to be sensed or otherwise applied to a material requiring temperature sensing and the transducer portion 13A thereof, which may comprise an electrical thermistor which assumes and senses its environmental temperature within a relatively short period of time and provides an electrical signal output, representative of the temperature sensed, to an amplifier 19, the output of which is connected to a voltage controlled oscillator 20. The output of such oscillator 20 is a frequency signal proportional to the temperature sensed and such oscillator acts as a clock for a counter 21 when it is connected through an AND gate 22 to the counter. The output of counter 21 is a coded digital signal which is representative of the number of cycles counted in a particular temperature measurement cycle wherein the length of such cycle is controlled by the period of an oscillator 23 having a feedback circuit 24 which provides a clock input to a JK flip-flop 25. The Q output of the flip-flop 25 provides the second input to the AND gate 22 and, when such flip-flop is activated, it allows the output of the voltage controlled oscillator 20 to be transferred through such AND gate 22, to the counter 21. When the counting period ends on the subsequent cycle of the oscillator 23, the flip-flop 25 toggles and its Q output becomes activated while its Q output becomes inactive. The inactivation of the Q output turns off the AND gate 22 thereby preventing the transfer of the output of the voltage controlled oscillator 20 to the counter 21. The activation of the Q output of the flip-flop 25 triggers a latch 26 to effect sampling and holding of the count generated on the output of counter 21. The output generated on the Q output of the flip-flop switch 25 also activates a delay circuit 27 which transfers a reset pulse to the reset input of the counter 21 after a time delay such as to allow for the setting of the latch 26, readying it for the next counter cycle.

The output of latch 26 is connected to a decoder-driver circuit 34 which operates to drive and maintain an indication of temperature on the display means 14, which may comprise an LED or LCD numerical display operable for displaying a numerical indication of the sensed temperature. The outputs of latch 26 are also connected to the inputs to a speech synthesizing circuit 28, such as manufactured by the Texas Instruments Corporation and designated TMC 0280, which is an integrated circuit including its support circuits and which creates synthesized electrical signals which are representative of words indicating the temperature sensed and displayed. Whenever a normally open push-button switch 15 is closed and it activates a time delay circuit 29 which is connected to the activation input of the speech synthesizor circuit 28, it being noted that the time delay is provided to permit the thermistor 13A of the temperature sensing device 13 to reach equillibrium with its ambient surroundings.

The output of the speech synthesizing circuit or computer 28 is passed to a amplifier 30, having a manually operable volume control unit 16. The output of amplifier 30 is conducted to a pluggable jack 17 to which may be connected an earphone 32 or a speaker 31 for transducing the synthetic speech signals to sounds of words indicating the temperature sensed.

In the event that the speech synthesizing circuit 28 operates to generate digital indications of speech, rather than analog indications, a suitable digital-to-analog converter may be provided in the output of the microelectronic circuit 28 and the amplifier 30.

Notation 33 refers to a a jack or female electrical connector supported by the endwall of housing 11 for receiving a pluggable terminal for a recharging source of electrical energy for recharging the battery (not shown) supported in the housing 11 for powering the circuits and electrical devices described when the bistable switch 15 is closed.

Other speech signal generating circuits and their attendant digital to analog signal converters for controllably generating speech signals of words or numbers indicative of the temperature measured or sensed when the push-button switch 15 is closed include the Texas Instruments TMC 0820 and circuits manufactured by such companies as Telesensory Systems, Inc. of Palo Alto, Calif.; Vortax Division of Federal Screw Works, Troy, Mich.; Periphonics Corporations of Bohemia, N.Y.; Interstate Electronics Corporation of Anaheim, Calif. and others such as Threshold Technology Inc. of Delran, N.J. the other components shown in FIG. 2, such as the VCO 20, the flip flop 25, the oscillator 23, the counter 21, the latch 26, and the decoder/driver 34 may all be constructed from discrete components. CMOS components may be used because of their low power consumption. Still further, any integrated or hybrid integrated circuit may be used.

In a modified form of the invention, the synthetic speech synthesizing circuit 28 may be programmed or contain an attendant control circuit which is programmed or otherwise operative to cause the following modes of operation of the device 10 or similar performing temperature indicating devices:

(a) When the temperature sensed by sensor 13A exceeds or falls below a preset limit or limits, the speech synthesizer 28 or a control therefore may be operable to effect the generation of speech signals defined by words indicating such condition in terms of its significance such as by generating at the speaker 31 warning words suggesting that a nurse or doctor be summoned or that certain corrective or alleviating action be taken such as a call for medication or other action.

(b) When the temperature sensed by sensor 13A exceeds or falls below a preset limit or limited, an indication of such condition may be had at a remote location such as a monitor station or a remote receiver held by a nurse or doctor by either transmitting a code which is indicative of the patient and condition sensed to such remote location by short wave wherein the code signal is decoded and applied to operate a warning device or display thereat or by actually transmitting speech signals generated by the speech synthesizing computer 28 via short wave transmitter 37 to such remote location and applying same to a short wave receiver and speaker therefore to generate speech which is indicative of the condition sensed and the identity of the patient wherein such patient indentification speech signals are preprogrammed in the computer 28 for reproproduction therefrom when signals input thereto from the counter or the driver 27 indicate such condition or conditions.

(c) The device illustrated in FIGS. 1 and 2 may be operably coupled to a patient or other device the temperature of which is to be constantly monitored over a period of time and may be operable as described above to generate a code signal or speech signals indicative of temperature sensed when it exceeds or falls below preset limits to transmit such speech or code signals to a remote monitor station for display and or use thereat in indicating such temperature conditions with sounds of words indicating same. In other words, computer 28 may either be a speech signal generator for generating selected or specific speech signals indicative of temperature and/or a code generating a circuit means for generating codes indicative of temperature or temperature conditions and the identity of the patient, system or location of the temperature so sensed and indicated.

Jack 17 may comprise or be provided with a manual switch for disconnecting speaker 31 from the output of amplifier 30 when the earphone 32 is connected thereto.

It should be understood with respect to the embodiments described, that a suitable power supply or supplies is provided to supply proper electrical energy for appropriately operating the various devices and circuits illustrated and described above.

It is further noted that push button switch 12 for effecting repeated generating of synthetic speech signals indicative of the temperature sensed may include or be replaced by a switch or contacts 33 which are closed when air is blown thereagainst or upon sensing a sound directed thereagainst or into a microphone disposed in cavity 31. This switch 33 is a sound operated means for closing said normaly open switch. Thus the human breath or spoken sounds may be used to activate the computer 28 to generate speech signals of words indicative of temperature sensed.

We claim:

1. A patient temperature measuring device comprising:

a support including a housing, a temperature sensing electrically operated transducer, a micro-electronic circuit means supported within said housing and connected to said transducer for receiving signals generated when said transducer senses temperature of material adjacent said transducer and operable to process said signals and generate output signals indicative of the temperature sensed, first temperature indicating means connected to receive signals from said electrical circuit means for displaying indications of the temperature sensed by said transducer, said first temperature indicating means including latch means for retaining a an indication of temperature sensed by said temperature sensing transducer, and readable display means for displaying said temperature sensed, second temperature indicating means connected to said electrical circuit means, and said first temperature indicating means, said second temperature indicating means including synthetic speech signal generating electronic circuit means and means for converting synthetic speech signals generated thereby to speech sounds indicative of the temperature displayed by said first temperature indicating means, means for repeatedly reproducing speech signals indicative of temperature to permit a person taking the temperature to have the verbal indication thereof repeated in the event that the first sound-verbal indication is not properly heard, and normally open switch means for controlling said second temperature indicating means to generate synthetic speech signals indicative of the temperature sensed by said transducing means and sound operated means for closing said normally open switch to cause said synthetic speech signal generating means to generate speech signals indicative of the temperature sensed by said transducing means.

2. A device in accordance with claim 1 wherein said means for converting speech signals generated by said speech signal generating means comprises a speaker supported by said housing.

3. A patient temperature measuring device comprising:

a support including a housing, a temperature sensing electrically operated transducer, housing and connected to said transducer for receiving signals generated when said transducer senses temperature of material adjacent said transducer and operable to process said signals and generate output signals indicative of the temperature sensed, first temperature indicating means connected to receive signals from said micro electronic circuit means for displaying indications of the temperature sensed by said transducer, said first temperature indicating means including latch means for retaining a readable indication of temperature sensed by said temperature sensing transducer, second temperature indicating means connected to said electrical circuit means and said first temperature indicating means, said second temperature indicating means including synthetic speech signal generating electronic circuit means and means for converting synthetic speech signals generated thereby to speech sounds indicative of the temperature displayed by said first temperature indicating means, means for repeatedly reproducing speech signals indicative of temperature to permit a person taking the temperature to have the verbal indication thereof repeated in the event that the first sound-verbal indication is not properly heard, means for generating a frequency signal whose frequency is controlled by said temperature sensing transducer, and means for counting said frequency signal for a predetermined period, whereby the count at the end of the counting period is digital code signal representative of the number of signals in a particular temperature measurement.

4. A patient temperature measuring device comprising:

a support including a housing, a temperature sensing electrically operated transducer, micro-electronic circuit means supported within said housing and connected to said transducer for receiving signals generated when said transducer senses temperature of a material adjacent said transducer and operable to process said signals generate output signals indicative of the temperature sensed, first temperature indicating means connected to receive signals from said electrical circuit means for displaying indications of the temperature sensed by said transducer, said first temperature indicating means including latch means for retaining a readable indication of temperature sensed by said temperature sensing transducer, second temperature indicating means connected to said electrical circuit means and to said first temperature indicating means, said second temperature indicating means including synthetic speech signal generating electronic circuit means and means for converting synthetic speech signals generated thereby to speech sounds indicative of the temperature displayed by said first temperature indicating means, means for repeatedly reproducing speech signals indicative of temperature to permit a person taking the temperature to have the verbal indication thereof repeated in the event that the first sound-verbal indication is not properly heard, further including a manually operable switch connecting said second temperature indicating means in circuit with said source of electrical energy and causing said synthetic speech signal generating means to generate synthetic speech signals indicative to the temperature measured when said manually operated switch is closed to effect the repeated reproduction of speech indications of temperature, wherein said manually operated switch is a normally open push-button switch, said synthetic speech signal generating means being operated to generate electrical signals defining words of synthetic speech indicative of the temperature displayed by said first indicating means whenever said push-button switch is manually closed.

5. A patient temperature measuring device comprising:

a support including a housing, a temperature sensing electrically operated transducer, micro-element circuit means supported within said housing and connected to said transducer for receiving signals indicative of the temperature of material adjacent said transducer and operable to process said signals and generate output signals indicative of the temperature sensed, first temperature indicating means connected to receive signals from said electrical circuit means for displaying indications of the temperature sensed by said transducer, wherein said first temperature indicating means includes latch means for retaining a readable indication of temperature sensed by said temperature sensing transducer, second temperature indicating means connected to said electrical circuit means and to said first temperature indicating means, said second temperature indicating means including synthetic speech signal generating electronic circuit means and means for converting synthetic speech signals generated thereby to speech sounds indicative of the temperature displayed by said first temperature indicating means, time delay means connected to said second temperature indicating means for activating said indicating means after said temperature sensing transducer has reached equilibrium with its ambient surroundings, and including normally open switch means for controlling said second temperature indicating means to generate synthetic speech signals indicative of the temperature sensed by said transducing means and sound operated means for closing said normally open switch to cause said synthetic speech signal generating means to generate speech signals indicative of the temperature sensed by said transducing means.

6. A patient temperature measuring device comprising:

a support including a housing, a temperature sensing electrically operated transducer, micro-electronic circuit means supported within said housing and connected to said transducer for receiving signals indicative of the temperature of material adjacent said transducer and operable to process said signals generate output signals indicative of the temperature sensed, first temperature indicating means connected to receive signals from said electrical circuit means for displaying indications of the temperature sensed by said transducer, wherein said first temperature indicating means includes latch means for retaining a readable indication of temperature sensed by said temperature sensing transducer, second temperature indicating means connected to said electrical circuit means and to said first temperature indicating means, said second temperature indicating means including synthetic speech signal generating electronic circuit means and means for converting synthetic speech signals generated thereby to speech sounds indicative of the temperature displayed by said first temperature indicating means, time delay means connected to said second temperature indicating means for activating said indicating means after said temperature sensing transducer has reached equilibrium with its ambient surroundings, and wherein said micro-electronic circuit means includes a means for generating a frequency signal whose frequency is controlled by said temperature sensing transducer and a means for counting said frequency signal for a predetermined period, whereby the count at the end of the counting period is a digital code signal representative of the number of signals in a particular temperature measurement.

7. A patient temperature measuring device comprising:

a support including a housing, a temperature sensing electrically operated transducer, micro-electronic circuit means supported within said housing and connected to said transducer for receiving signals indicative of the temperature of material adjacent said transducer and operable to process said signals generate output signals indicative of the temperature sensed, first temperature indicating means connected to receive signals from said electrical circuit means for displaying indications of the temperature sensed by said transducer, wherein said first temperature indicating means includes latch means for retaining a readable indication of temperature sensed by said temperature sensing transducer, second temperature indicating means connected to said electrical circuit means and to said first temperature indicating means, said second temperature indicating means including synthetic speech signal generating electronic circuit means and means for converting synthetic speech signals generated thereby to speech sounds indicative of the temperature displayed by said first temperature indicating means, time delay means connected to said second temperature indicating means for activating said indicating means after said temperature sensing transducer has reached equilibrium with its ambient surroundings, and further including a manually operable switch connecting said second temperature indicating means in circuit with said source of electrical energy and causing said synthetic speech signal generating means to generate synthetic speech singals indicative of the temperature measured when said manually operated switch is closed to effect the repeated reproduction of speech indications of temperature, wherein said manually operated switch is a normally open push-button switch, said synthetic speech signal generating means being operated to generate electrical signals defining words of synthetic speech indicative of the temperature displayed by said first indicating means whenever said push-button switch is manually closed.

8. A device in accordance with claims 1, 3 or 4 wherein said means for converting speech signals to sounds of words comprises a speaker earpiece and a flexible line extending from said housing to said earpiece to permit said earpiece to be connected to the ear of a person using said device.

9. A device in accordance with claims 1, 3, or 4 further including short wave transmitting means for transmitting signals generated by said second temperature indicating means to a remote location.

10. The apparatus of claims 1, 3 or 4 wherein said micro-electronic circuit means includes means for generating a digital code signal which indicates the patient temperature.

11. A temperature measuring device in accordance with claims 1, 3, or 4 wherein said temperature sensing electrically operated transducing means is supported by said housing.

12. A device in accordance with claims 1, 3, or 4 wherein said temperture sensing electrically operated transducing means is separate from said housing, further including a flexible wire connecting said transducing means to the electrical circuit means supported within said housing.

13. The apparatus of claim 3 or 6 wherein said predetermined period is controlled by an oscillator.

14. The apparatus of claim 3 or 6 wherein said means for generating a frequency signal is a voltage controlled oscillator.

* * * * *